(12) United States Patent
Hokazono (10) Patent No.: US 9,733,025 B2
(45) Date of Patent: Aug. 15, 2017

(54) FLAT HEAT TRANSFER TUBE, MANUFACTURING METHOD OF CROSS FIN TUBE TYPE HEAT EXCHANGER HAVING THE SAME, AND CROSS FIN TUBE TYPE HEAT EXCHANGER MANUFACTURED BY THE SAME MANUFACTURING METHOD

(71) Applicant: Keisuke Hokazono, Tokyo (JP)

(72) Inventor: Keisuke Hokazono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 203 days.

(21) Appl. No.: 14/439,767

(22) PCT Filed: Nov. 13, 2012

(86) PCT No.: PCT/JP2012/079376
§ 371 (c)(1),
(2) Date: Apr. 30, 2015

(87) PCT Pub. No.: WO2014/076757
PCT Pub. Date: May 22, 2014

(65) Prior Publication Data
US 2015/0285567 A1    Oct. 8, 2015

(51) Int. Cl.
*F28F 1/20*    (2006.01)
*F28F 1/10*    (2006.01)
(Continued)

(52) U.S. Cl.
CPC ............ *F28F 1/10* (2013.01); *B21D 53/08* (2013.01); *B23P 15/26* (2013.01); *F28F 1/022* (2013.01);
(Continued)

(58) Field of Classification Search
CPC ...... F28F 1/10; F28F 1/022; F28F 1/32; F28F 1/325; F28F 1/00; B21D 53/08; B21D 7/08
(Continued)

(56) References Cited

U.S. PATENT DOCUMENTS

| | | | |
|---|---|---|---|
| 3,604,503 A * | 9/1971 | Feldman, Jr. ........... | F28D 15/06 165/104.26 |
| 2009/0065183 A1 * | 3/2009 | Uneno .................... | F28F 1/022 165/152 |

(Continued)

FOREIGN PATENT DOCUMENTS

| JP | S63-189791 A | 8/1988 |
|---|---|---|
| JP | H04-105734 A | 4/1992 |

(Continued)

OTHER PUBLICATIONS

Office Action issued May 25, 2016 in corresponding CN application No. 201280077032.0 (with English translation).
(Continued)

*Primary Examiner* — Davis Hwu
(74) *Attorney, Agent, or Firm* — Posz Law Group, PLC (57) ABSTRACT

A flat heat transfer tube is used for a cross fin tube type heat exchanger including the flat heat transfer tube having a bending portion and a plurality of holes extending in a direction parallel with an axis direction of the flat heat transfer tube, and a plurality of plate fins bonded by welding to the flat heat transfer tube, wherein an interval between an outer surface of the flat heat transfer tube and an inner surface of the hole of a portion which is curved with a small curvature during bending is larger than an interval between an outer surface of the flat heat transfer tube and an inner surface of the hole of a portion which is curved with a large curvature during bending in a cross section of a portion of (Continued)

the flat heat transfer tube which corresponds to the bending portion before bending.

9 Claims, 7 Drawing Sheets

(51) Int. Cl.
  *F28F 1/32* (2006.01)
  *F28F 1/02* (2006.01)
  *B23P 15/26* (2006.01)
  *B21D 53/08* (2006.01)
  *F28D 21/00* (2006.01)
  *F28D 1/02* (2006.01)
  *F25B 39/00* (2006.01)
  *B21D 7/08* (2006.01)
(52) U.S. Cl.
  CPC .............. *F28F 1/32* (2013.01); *F28F 1/325* (2013.01); *B21D 7/08* (2013.01); *F25B 39/00* (2013.01); *F28D 2001/0273* (2013.01); *F28D 2021/0068* (2013.01); *F28F 2250/02* (2013.01); *Y10T 29/4935* (2015.01)
(58) Field of Classification Search
  USPC .................................................. 165/181, 177
  See application file for complete search history.

(56) References Cited

U.S. PATENT DOCUMENTS

| 2012/0111551 A1* | 5/2012 | Cao et al. | F28F 1/36 165/181 |
| 2013/0068437 A1* | 3/2013 | Matsumoto | B21C 37/151 165/177 |

FOREIGN PATENT DOCUMENTS

| JP | 2002-139282 A | 5/2002 |
| JP | 2010-025478 A | 2/2010 |
| JP | 2012-032121 A | 2/2012 |

OTHER PUBLICATIONS

Extended European Search Report dated Jul. 20, 2016 issued in corresponding EP patent application No. 12888415.2.
International Search Report of the International Searching Authority mailed Jan. 22, 2013 for the corresponding international application No. PCT/JP2012/079376 (and English translation).
Office Action mailed Aug. 18, 2015 issued in corresponding JP patent application No. 2014-546756 (and English translation).
Office Action mailed Dec. 15, 2015 issued in corresponding JP patent application No. 2014-546756 (and English translation).

* cited by examiner

Related Art

FIG. 5

Related Art

Related Art

FIG. 10

Related Art

Related Art

FLAT HEAT TRANSFER TUBE, MANUFACTURING METHOD OF CROSS FIN TUBE TYPE HEAT EXCHANGER HAVING THE SAME, AND CROSS FIN TUBE TYPE HEAT EXCHANGER MANUFACTURED BY THE SAME MANUFACTURING METHOD

CROSS REFERENCE TO RELATED APPLICATION

This application is a U.S. national stage application of PCT/JP2012/079376 filed on Nov. 13, 2012, the contents of which are incorporated herein by reference.

TECHNICAL FIELD

The present invention relates to a flat heat transfer tube, a manufacturing method of cross fin tube type heat exchanger having the flat heat transfer tube, and a cross fin tube type heat exchanger manufactured by the same manufacturing method.

BACKGROUND ART

Conventional cross fin tube type heat exchangers include one which includes a flat heat transfer tube in which a plurality of holes are formed to penetrate in a direction parallel with an axis direction of the flat heat transfer tube and a plurality of plate fins bonded to the flat heat transfer tube so that the longitudinal direction of the plate fins intersects the long diameter direction of the cross section of the flat heat transfer tube (see Patent Literature 1).

Refrigerant is supplied to the holes of the flat heat transfer tube.

The flat heat transfer tube is inserted into a notch formed on the plate fins.

CITATION LIST

Patent Literature

Patent Literature 1: Japanese Unexamined Patent Application Publication No. 2012-32121 (paragraphs [0011]-[0046], FIGS. 1-7)

SUMMARY OF INVENTION

Technical Problem

In this type of cross fin tube type heat exchanger, a plurality of notches are formed on each of the plurality of plate fins.

Then, a straight flat heat transfer tube is mounted in each of the plurality of notches.

That is, the flat heat transfer tubes of the number equal to the number of the plurality of notches are necessary.

Further, for example, when an air flow is suctioned into the housing in a plurality of directions, or an air flow is ejected from the housing in a plurality of directions, separate cross fin tube type heat exchangers may be disposed in each of the plurality of directions.

Accordingly, there is a problem that the number of parts and assembly steps of the device in which the cross fin tube type heat exchanger is incorporated is increased, which results in the increase in cost of the device.

It has been proposed that the flat heat transfer tube is bent in the short diameter direction of the cross section and processed into a meandering shape, and one flat heat transfer tube is mounted in a plurality of notches of one plate fin.

Further, the flat heat transfer tube is bent in the long diameter direction of the cross section and processed into, for example, U shape and L shape, and one flat heat transfer tube is exposed to the air flow of a plurality of directions.

However, there is a problem that, when the flat heat transfer tube is bent, the interval between the outer surface of the flat heat transfer tube and the inner surface of the hole on the outer side of the bending, that is, the wall thickness is decreased, and a pressure resistance strength against the pressure of the refrigerant supplied to the hole is not ensured.

Further, there is a problem that, when the entire wall thickness is increased in order to ensure the pressure resistance strength, the cost of flat heat transfer tube is increased since the weight and material cost are increased and a load during processing is also increased.

The present invention has been made to overcome the above problems, and provides a flat heat transfer tube which prevents the decrease in pressure resistance strength and the increase in cost, a manufacturing method of a cross fin tube type heat exchanger having the flat heat transfer tube, and a cross fin tube type heat exchanger manufactured by the same manufacturing method.

Solution to Problem

A flat heat transfer tube according to the invention is a flat heat transfer tube used for a cross fin tube type heat exchanger including the flat heat transfer tube having a bending portion and a plurality of holes extending through in a direction parallel with an axis direction of the flat heat transfer tube, and a plurality of plate fins bonded by welding to the flat heat transfer tube, wherein an interval between an outer surface of the flat heat transfer tube and an inner surface of the hole of a portion which is curved with a small curvature during bending is larger than an interval between an outer surface of the flat heat transfer tube and an inner surface of the hole of a portion which is curved with a large curvature during bending in a cross section of a portion of the flat heat transfer tube which corresponds to the bending portion before bending.

Advantageous Effects of Invention

In the flat heat transfer tube according to the invention, an interval between an outer surface of the flat heat transfer tube and an inner surface of the hole of a portion which is curved with a small curvature during bending is larger than an interval between an outer surface of the flat heat transfer tube and an inner surface of the hole of a portion which is curved with a large curvature during bending in a cross section of a portion of the flat heat transfer tube which corresponds to the bending portion before bending. Accordingly, the wall thickness on the outer side of the bending in the state after bending is not insufficient, and a pressure resistance strength against the pressure of the refrigerant supplied to the holes is ensured.

Further, since only the wall thickness of a necessary portion is increased without increasing the entire wall thickness, the increase in cost can be prevented.

DESCRIPTION OF EMBODIMENTS

With reference to the drawings, a flat heat transfer tube according to the invention will be described below.

Throughout the drawings, the same or similar members or parts are denoted by the same reference numbers.

Further, illustration of detailed configuration is simplified or omitted as appropriate.

The duplicated or similar description is also simplified or omitted as appropriate.

Embodiment 1

A flat heat transfer tube according to Embodiment 1 will be described.
(Configuration of Flat Heat Transfer Tube)

A configuration of a flat heat transfer tube according to Embodiment 1 will be described.

Figure 1:
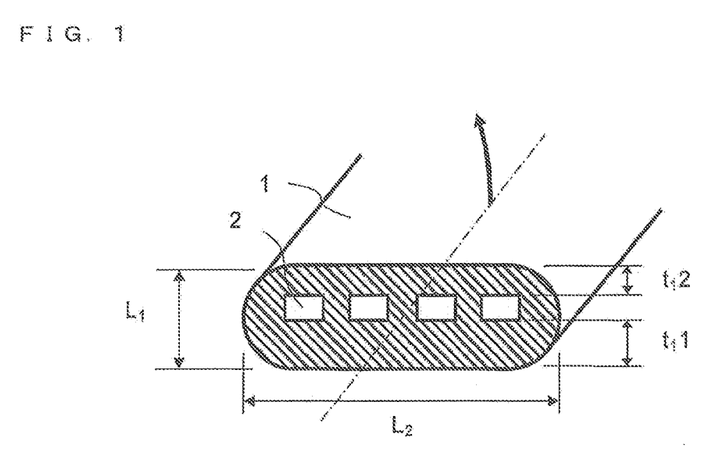
FIG. 1 is a cross sectional view of a flat heat transfer tube in the state before bending according to Embodiment 1 of the invention.

FIG. 1 is a cross sectional view of a flat heat transfer tube in the state before bending according to Embodiment 1.

As shown in FIG. 1, a plurality of holes 2 is formed in a flat heat transfer tube 1 so as to extend in a direction parallel with an axis direction of the flat heat transfer tube 1.

In a cross section of the flat heat transfer tube 1, the flat heat transfer tube 1 has a length $L_1$ in a short diameter direction and a length $L_2$ in a long diameter direction.

The flat heat transfer tube 1 is bent in a direction of the arrow shown in FIG. 1, that is, in the short diameter direction.

Refrigerant is supplied to the plurality of holes 2.

The plurality of holes 2 is arranged in the long diameter direction of the flat heat transfer tube 1 with a substantially equal interval.

The interval between the outer surface of the flat heat transfer tube 1 and the inner surface of the hole 2 on the outer side of the bending, that is, a wall thickness $t_1 1$ is larger than a wall thickness $t_1 2$ on the inner side of the bending.

The hole 2 is not limited to a rectangular shape and may be any other shape such as circular and elliptical shapes.

Further, the number of holes 2 is not limited to four.

Figure 2:
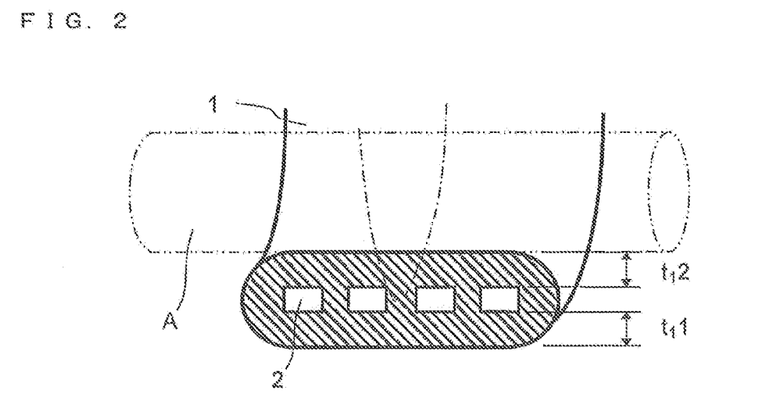
FIG. 2 is a cross sectional view of a bending portion of the flat heat transfer tube in the state after bending according to Embodiment 1 of the invention.

FIG. 2 is a cross sectional view of a bending portion of the flat heat transfer tube in the state after bending according to Embodiment 1.

FIG. 2 shows a cross section of a top part of a bending section of the flat heat transfer tube 1 which is bent at 180 degrees, that is, in a hairpin shape.

When bending the flat heat transfer tube 1, a cylindrical jig A is pressed against the flat heat transfer tube 1 with the axis being parallel with the long diameter direction of the cross section of the flat heat transfer tube 1.

Accordingly, a compressive force is generated on the inner side of the bending and a tensile force is generated on the outer side of the bending with respect to the axis of the flat heat transfer tube 1.

When the flat heat transfer tube 1 is bent, the wall thickness $t_1 1$ on the outer side of the bending in the cross section of the bending portion is decreased and the wall thickness $t_1 2$ on the inner side of the bending is increased.

In the flat heat transfer tube 1, the plurality of holes 2 are formed so that the wall thickness $t_1 1$ on the outer side of the bending is larger than the wall thickness $t_1 2$ on the inner side of the bending in the state before bending.

As a result, in the flat heat transfer tube 1 in the state after bending, the wall thickness $t_1 1$ on the outer side of the bending becomes substantially the same as the wall thickness $t_1 2$ on the inner side of the bending.

The following explains how the wall thickness $t_1 1$ on the outer side of the bending in the state before bending is determined will be described.

Figure 3:
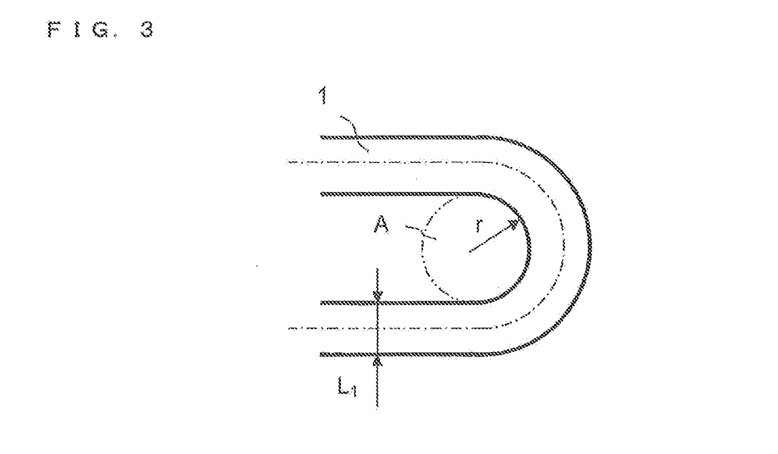
FIG. 3 is a view which shows the bending portion of the flat heat transfer tube according to Embodiment 1 of the invention.

FIG. 3 is a view which shows the bending portion of the flat heat transfer tube according to Embodiment 1.

As shown in FIG. 3, since the dimension does not vary on the axis of the flat heat transfer tube 1, an elongation rate a of the material on the outer side of the bending is expressed by the following equation 1.

In the equation 1, $L_1$ is a length in the short diameter direction of the cross section of the flat heat transfer tube 1, and r is a radius of curvature on the inner side of the bending, that is, a radius of the jig A.

[Math. 1]

$$a = \frac{r + L_1}{r + L_1/2} \quad \text{(Equation 1)}$$

On the outer side of the bending, since the material is elongated with the elongation rate a with respect to the axis of the flat heat transfer tube 1, the wall thickness becomes small while maintaining a constant volume.

On the inner side of the bending, since the material is compressed with respect to the axis of the flat heat transfer tube 1, the wall thickness becomes large.

The wall thickness $t_1 1$ on the outer side of the bending is determined by the following equation 2 based on a minimum interval t0 which is required in the state after bending and the elongation rate a.

[Math. 2]

$$t_1 1 = t0 \times a \quad \text{(Equation 2)}$$

(Effect of the Flat Heat Transfer Tube)

An effect of the flat heat transfer tube according to Embodiment 1 will be described.

Figure 4:
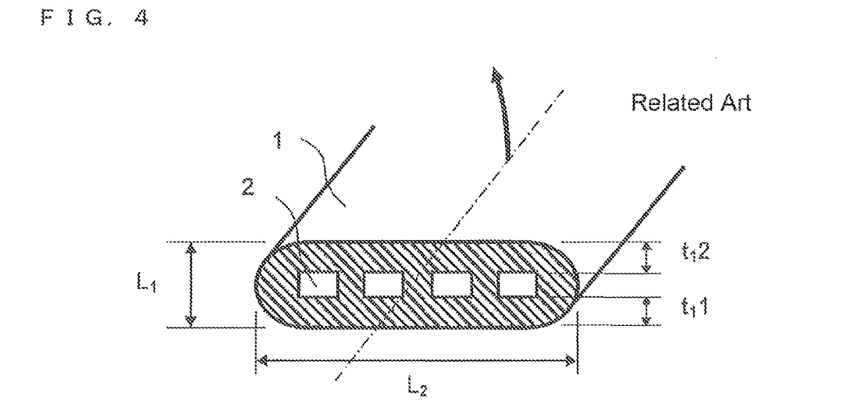
FIG. 4 is a cross sectional view of a conventional flat heat transfer tube in the state before bending.

FIG. 4 is a cross sectional view of a conventional flat heat transfer tube in the state before bending.

As shown in FIG. 4, in the conventional flat heat transfer tube, the wall thickness $t_1 1$ on the outer side of the bending is smaller than that of the flat heat transfer tube according to Embodiment 1 in the state before bending.

Figure 5:
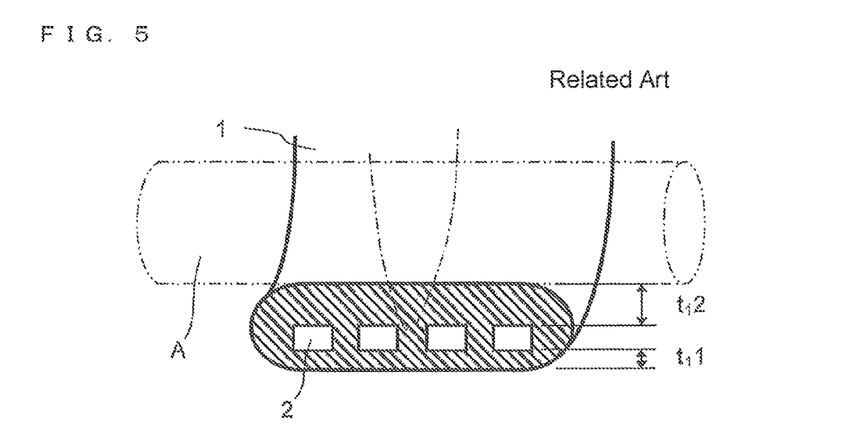
FIG. 5 is a cross sectional view of the bending portion of the conventional flat heat transfer tube in the state after bending.

FIG. 5 is a cross sectional view of the bending portion of the conventional flat heat transfer tube in the state after bending.

Accordingly, as shown in FIG. 5, the wall thickness $t_1 1$ on the outer side of the bending in the state after bending becomes insufficient, and a pressure resistance strength against the pressure of the refrigerant supplied to the holes 2 is not ensured.

Further, when the entire wall thickness is increased in order to ensure the pressure resistance strength, the cost of the flat heat transfer tube is increased.

On the other hand, in the flat heat transfer tube 1 in the state before bending, the wall thickness $t_1 1$ on the outer side of the bending is sufficiently large.

Accordingly, only the wall thickness $t_1 1$ on the outer side of the bending in the state after bending is not insufficient, and a pressure resistance strength against the pressure of the refrigerant supplied to the holes 2 is ensured.

Further, since the wall thickness of a necessary portion is increased without increasing the entire wall thickness, the cost of the flat heat transfer tube 1 is prevented from being increased.

Embodiment 2

The flat heat transfer tube according to Embodiment 2 will be described.

Description which is duplicated by or similar to that of the flat heat transfer tube according to Embodiment 1 will be simplified or omitted as appropriate.

(Configuration of Flat Heat Transfer Tube)

A configuration of the flat heat transfer tube according to Embodiment 2 will be described.

Figure 6:
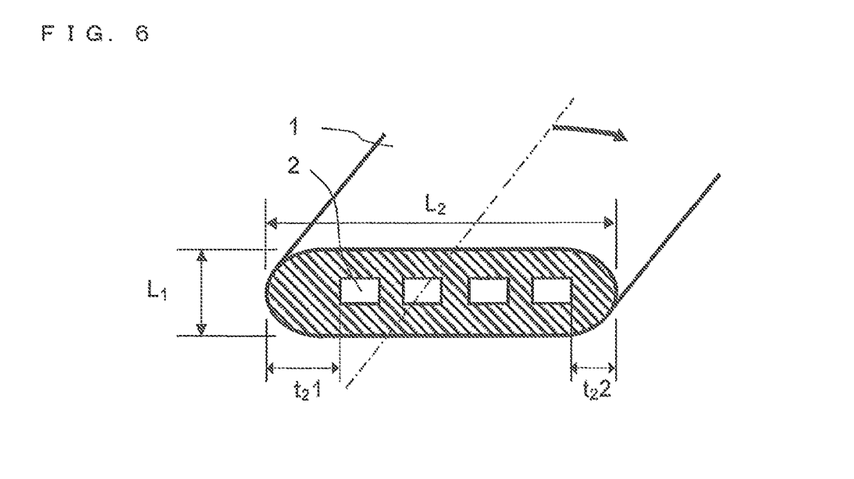
FIG. 6 is a cross sectional view of the flat heat transfer tube in the state before bending according to Embodiment 2 of the invention.

FIG. 6 is a cross sectional view of the flat heat transfer tube in the state before bending according to Embodiment 2 of the invention.

The flat heat transfer tube 1 is bent in a direction of the arrow shown in FIG. 6, that is, in the long diameter direction.

The plurality of holes 2 is arranged in the long diameter direction of the flat heat transfer tube 1 with a substantially equal interval.

The interval between the outer surface of the flat heat transfer tube 1 and the inner surface of the hole 2 on the outer side of the bending, that is, a wall thickness $t_2 1$ is larger than a wall thickness $t_2 2$ on the inner side of the bending.

The hole 2 formed on the outer side of the bending may be formed in smaller size so that the wall thickness $t_2 1$ formed on the outer side of the bending becomes larger than the wall thickness $t_2 2$ on the inner side of the bending.

Figure 7:
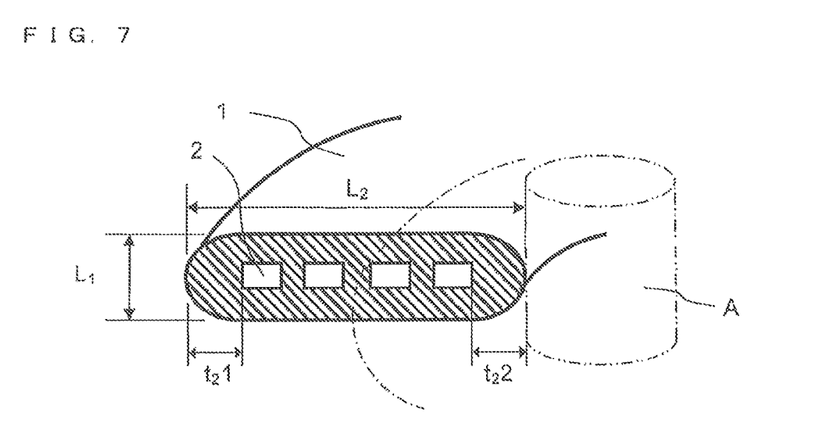
FIG. 7 is a cross sectional view of the bending portion of the flat heat transfer tube in the state after bending according to Embodiment 2 of the invention.

FIG. 7 is a cross sectional view of the bending portion of the flat heat transfer tube in the state after bending according to Embodiment 2.

FIG. 7 shows a cross section of a top part of a bending section of the flat heat transfer tube 1 which is bent at 90 degrees.

When bending the flat heat transfer tube 1, a cylindrical jig A is pressed against the flat heat transfer tube 1 with the axis being parallel with the short diameter direction of the cross section of the flat heat transfer tube 1.

Accordingly, a compressive force is generated on the inner side of the bending and a tensile force is generated on the outer side of the bending with respect to the axis of the flat heat transfer tube 1.

When the flat heat transfer tube 1 is bent, the wall thickness $t_2 1$ on the outer side of the bending in the cross section of the bending portion is decreased and the wall thickness $t_2 2$ on the inner side of the bending is increased.

In the flat heat transfer tube 1, the plurality of holes 2 are formed so that the wall thickness $t_2 1$ on the outer side of the bending is larger than the wall thickness $t_2 2$ on the inner side of the bending in the state before bending.

As a result, in the flat heat transfer tube 1 in the state after bending, the wall thickness $t_2 1$ on the outer side of the bending becomes substantially the same as the wall thickness $t_2 2$ on the inner side of the bending.

The following explains how the wall thickness $t_2 1$ on the outer side of the bending in the state before bending is determined will be described.

Figure 8:
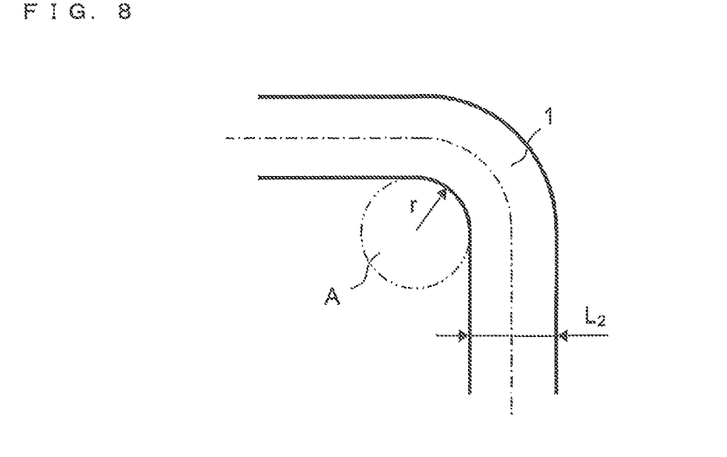
FIG. 8 is a view which shows the bending portion of the flat heat transfer tube according to Embodiment 2 of the invention.

FIG. 8 is a view which shows the bending portion of the flat heat transfer tube according to Embodiment 2.

As shown in FIG. 8, since the dimension does not vary on the axis of the flat heat transfer tube 1, an elongation rate a of the material on the outer side of the bending is expressed by the following equation 3.

In the equation 3, $L_2$ is a length in the long diameter direction of the cross section of the flat heat transfer tube 1, and r is a radius of curvature on the inner side of the bending, that is, a radius of the jig A.

[Math. 3]

$$a = \frac{r + L_2}{r + L_2/2} \quad \text{(Equation 3)}$$

On the outer side of the bending, since the material is elongated with the elongation rate a with respect to the axis of the flat heat transfer tube 1, the wall thickness becomes thin while maintaining a constant volume.

On the inner side of the bending, since the material is compressed with respect to the axis of the flat heat transfer tube 1, the wall thickness becomes large.

The wall thickness $t_2 1$ on the outer side of the bending is determined by the following equation 4 based on a minimum interval t0 which is required in the state after bending and the elongation rate a.

[Math. 4]

$$t_2 1 = t0 \times a \quad \text{(Equation 4)}$$

(Effect of the Flat Heat Transfer Tube)

An effect of the flat heat transfer tube according to Embodiment 2 will be described.

Figure 9:
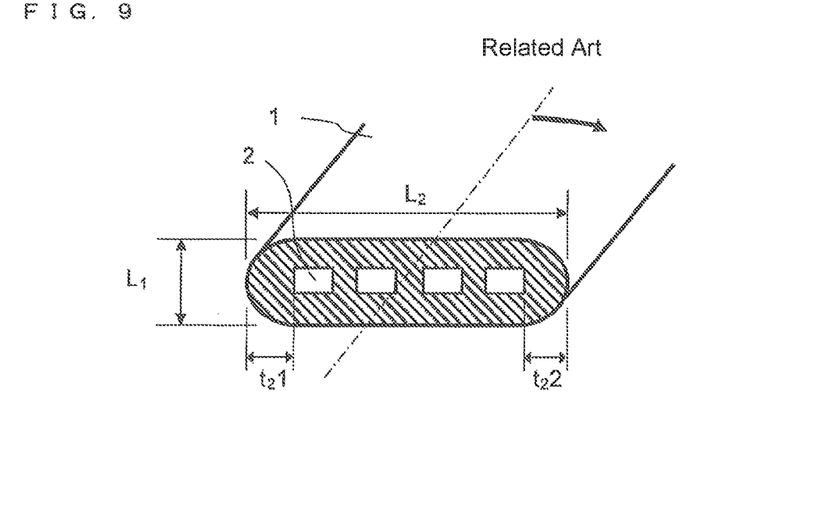
FIG. 9 is a cross sectional view of a conventional flat heat transfer tube in the state before bending.

FIG. 9 is a cross sectional view of a conventional flat heat transfer tube in the state before bending.

As shown in FIG. 9, in the conventional flat heat transfer tube, the wall thickness $t_2 1$ on the outer side of the bending is smaller than that of the flat heat transfer tube according to Embodiment 2 in the state before bending.

Figure 10:
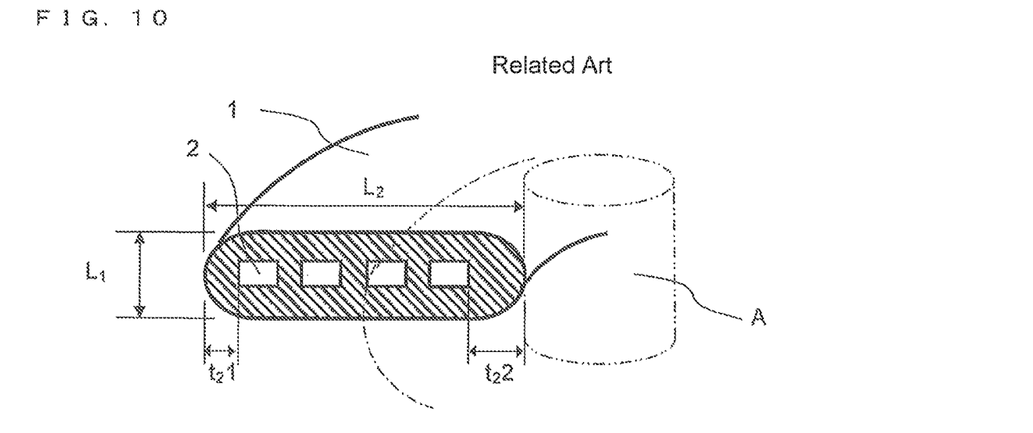
FIG. 10 is a cross sectional view of the bending portion of the conventional flat heat transfer tube in the state after bending.

FIG. 10 is a cross sectional view of the bending portion of the conventional flat heat transfer tube in the state after bending.

Accordingly, as shown in FIG. 10, the wall thickness $t_2 1$ on the outer side of the bending in the state after bending becomes insufficient, and a pressure resistance strength against the pressure of the refrigerant supplied to the holes 2 is not ensured.

Further, when the entire wall thickness is increased in order to ensure the pressure resistance strength, the cost of the flat heat transfer tube is increased.

On the other hand, in the flat heat transfer tube 1 in the state before bending, the wall thickness $t_2 1$ on the outer side of the bending is sufficiently large.

Accordingly, the wall thickness $t_2 1$ on the outer side of the bending in the state after bending is not insufficient, and a pressure resistance strength against the pressure of the refrigerant supplied to the holes 2 is ensured.

Further, since the wall thickness of a necessary portion is increased without increasing the entire wall thickness, the cost of the flat heat transfer tube 1 is prevented from being increased.

(Variation)

Figure 11:
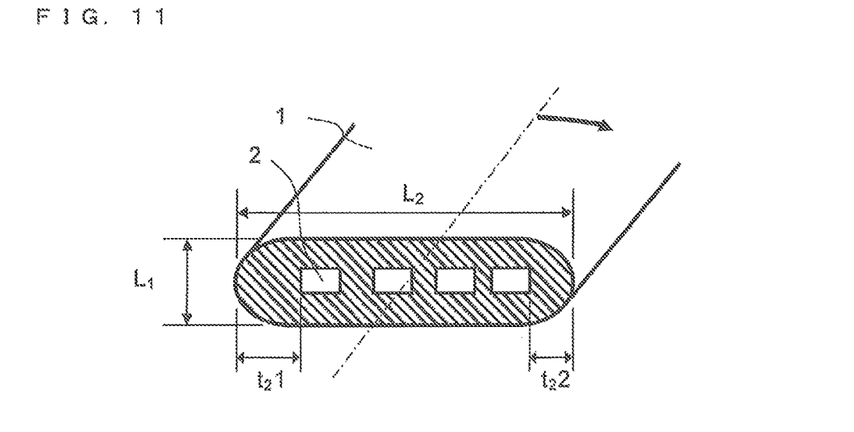
FIG. 11 is a cross sectional view of a variation of the flat heat transfer tube in the state before bending according to Embodiment 2 of the invention.

FIG. 11 is a cross sectional view of a variation of the flat heat transfer tube in the state before bending according to Embodiment 2.

As shown in FIG. 11, the plurality of holes 2 may be formed so that the wall thickness $t_2 1$ on the outer side of the bending is larger than the wall thickness $t_2 2$ on the inner side of the bending, and further, the interval between the adjacent holes 2 on the outer side of the bending is larger than the interval between the adjacent holes 2 on the inner side of the bending.

The plurality of holes 2 may also be arranged so that the interval between the center of the plurality of holes 2 increases toward the outer side of the bending while each hole 2 having the same size, or alternatively, the size of the plurality of holes 2 increases while maintaining the same interval between the center of the plurality of holes 2.

Figure 12:
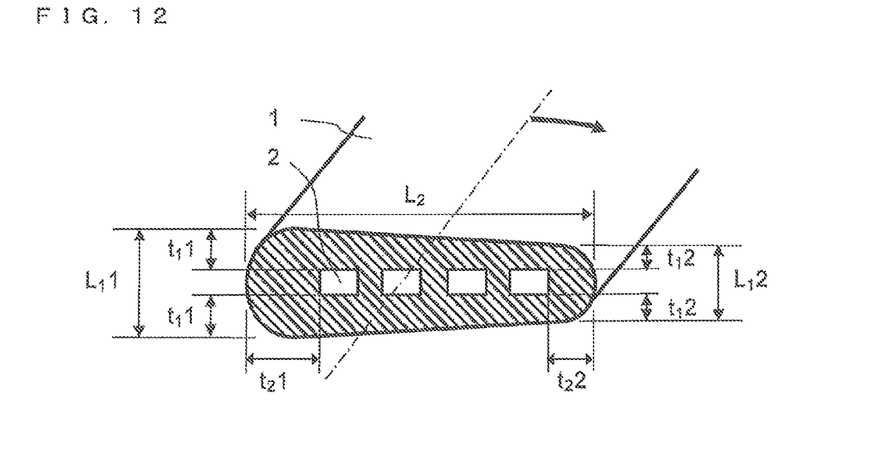
FIG. 12 is a cross sectional view of a variation of the flat heat transfer tube in the state before bending according to Embodiment 2 of the invention.

FIG. 12 is a cross sectional view of a variation of the flat heat transfer tube in the state before bending according to Embodiment 2.

As shown in FIG. 12, the plurality of holes 2 may be arranged so that a length $L_1 1$ of the outer side of the bending in the short diameter direction is larger than a length $L_1 2$ of the inner side of the bending in the short diameter direction in the state before bending, that is, the wall thickness $t_1 1$ of the outer side of the bending in the short diameter direction is larger than the wall thickness $t_1 2$ of the inner side of the bending in the short diameter direction.

Figure 13:
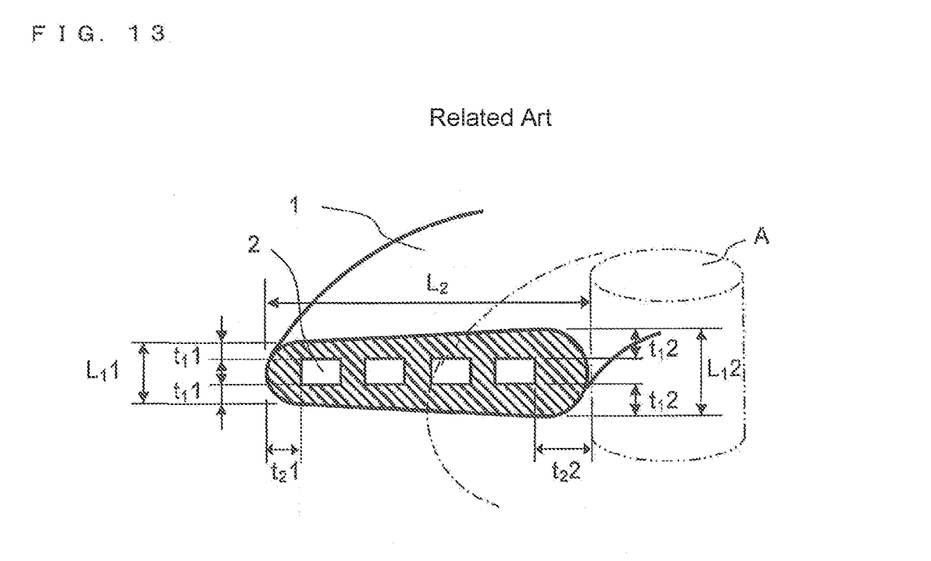
FIG. 13 is a cross sectional view of the bending portion of a conventional flat heat transfer tube in the state after bending.

FIG. 13 is a cross sectional view of the bending portion of a conventional flat heat transfer tube in the state after bending.

As shown in FIG. 13, in the conventional flat heat transfer tube, the length $L_1 1$ of the outer side of the bending in the short diameter direction is smaller than the length $L_1 2$ of the outer side of the bending in the short diameter direction in the state after bending.

Accordingly, the wall thickness $t_1 1$ of the outer side of the bending in the short diameter direction becomes insufficient.

As shown in FIG. 12, when the wall thickness $t_1 1$ of the outer side of the bending in the short diameter direction is large in the state before bending, the wall thickness $t_1 1$ of the outer side of the bending in the short diameter direction is prevented from being insufficient in the state after bending.

Embodiment 3

The flat heat transfer tube according to Embodiment 3 will be described.

The flat heat transfer tube according to Embodiment 3 is incorporated in the cross fin tube type heat exchanger.

Description which is duplicated by or similar to that of the flat heat transfer tube according to Embodiment 1 and Embodiment 2 will be simplified or omitted as appropriate.

(Configuration of Cross Fin Tube Type Heat Exchanger)

A configuration of the cross fin tube type heat exchanger in which the flat heat transfer tube according to Embodiment 3 is incorporated will be described.

Figure 14:
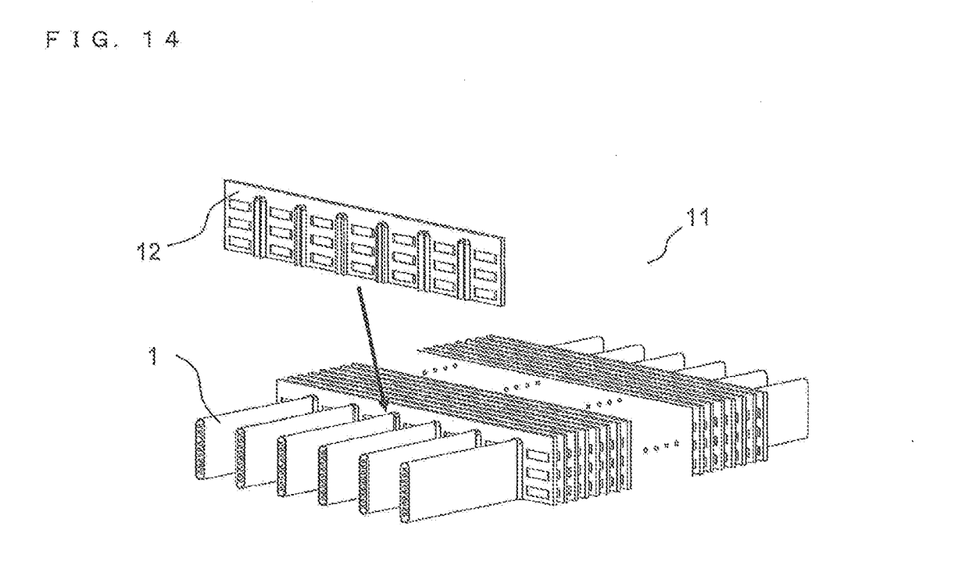
FIG. 14 is a view of a configuration of a cross fin tube type heat exchanger in which the flat heat transfer tube of Embodiment 3 of the invention is incorporated.

FIG. 14 is a view of a configuration of a cross fin tube type heat exchanger in which the flat heat transfer tube of Embodiment 3 is incorporated.

As shown in FIG. 14, the cross fin tube type heat exchanger 11 includes the flat heat transfer tube 1 and the plurality of plate fins 12.

The cross fin tube type heat exchanger 11 may include a plurality of straight flat heat transfer tubes 1 or may include the meandering flat heat transfer tube 1 processed in a hairpin shape.

The flat heat transfer tube 1 has the same configuration as that of the flat heat transfer tube of Embodiment 2.

When the flat heat transfer tube 1 is the meandering flat heat transfer tube 1 which is processed in a hairpin shape, the flat heat transfer tube 1 may have a configuration similar to that of the flat heat transfer tube according to Embodiment 1.

The plate fin 12 is, for example, made of aluminum.

A plurality of U-shaped notches are formed on one long side of the plate fin 12 in the longitudinal direction.

The notch does not reach the other side of the plate fin 12.

The depth of the notch is shorter than the length L2 in the long diameter direction of the cross section of the flat heat transfer tube 1.

The flat heat transfer tubes 1 are inserted into the notches so that the longitudinal direction of the plate fins 12 intersects the long diameter direction of the cross section of the flat heat transfer tubes 1.

The outer surface of the flat heat transfer tubes 1 and the inner surface of the notches are bonded by welding.

(Manufacturing Method of Cross Fin Tube Type Heat Exchanger)

The following described a manufacturing method of the cross fin tube type heat exchanger in which the flat heat transfer tube according to Embodiment 3 is incorporated.

Figure 15:
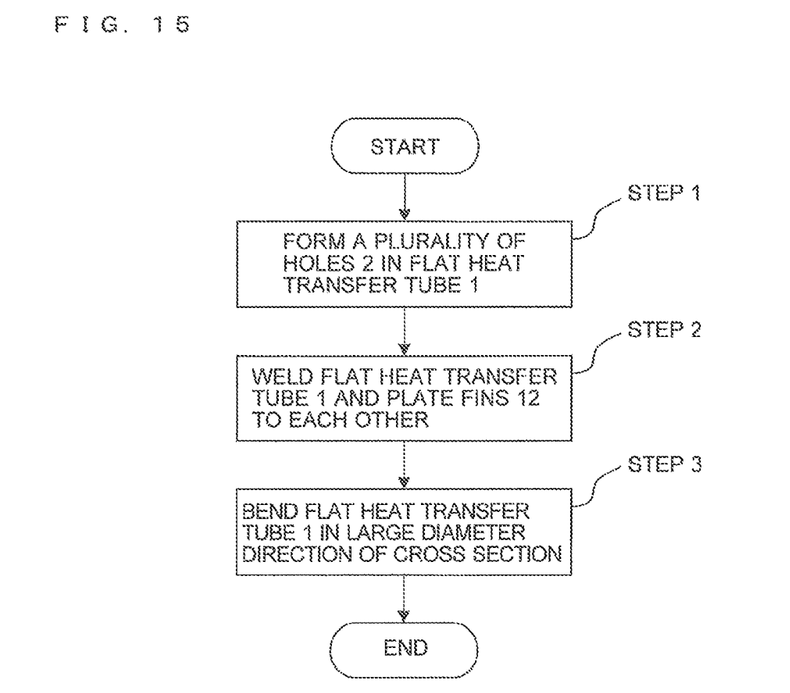
FIG. 15 is a flow chart which shows a manufacturing method of the cross fin tube type heat exchanger in which the flat heat transfer tube of Embodiment 3 of the invention is incorporated.

FIG. 15 is a flow chart which shows a manufacturing method of the cross fin tube type heat exchanger in which the flat heat transfer tube of Embodiment 3 is incorporated.

First, in step 1, the plurality of holes 2 are formed in the flat heat transfer tube 1 by a processing such as drawing.

In step 2, as shown in FIG. 14, the flat heat transfer tube 1 and the plurality of plate fins 12 are bonded by welding.

Since the depth of the notch is smaller than the length in the long diameter direction L2 of the cross section of the flat heat transfer tube 1, one end of the cross section of the flat heat transfer tube 1 in the long diameter direction protrudes from the notch.

In step 3, the welded cross fin tube type heat exchanger 11 is bent in the long diameter direction of the cross section of the flat heat transfer tube 1 in a similar manner to the flat heat transfer tube of Embodiment 2.

The jig A is pressed against the end of the flat heat transfer tube 1 which protrudes from the notch.

That is, in the state after bending, the plate fins 12 protrude to the outside of the flat heat transfer tube 1 which is bent.

(Usage of Cross Fin Tube Type Heat Exchanger)

Usage of the cross fin tube type heat exchanger in which the flat heat transfer tube of Embodiment 3 is incorporated.

First, a refrigeration cycle in which the cross fin tube type heat exchanger 11 is used will be described.

The following describes the case where the cross fin tube type heat exchanger 11 is used in a refrigeration cycle of the air-conditioning apparatus 21.

The cross fin tube type heat exchanger 11 may be used in other types of refrigeration cycles of the air-conditioning apparatus 21, or alternatively, may be used in the refrigeration cycles of other devices.

Figure 16:
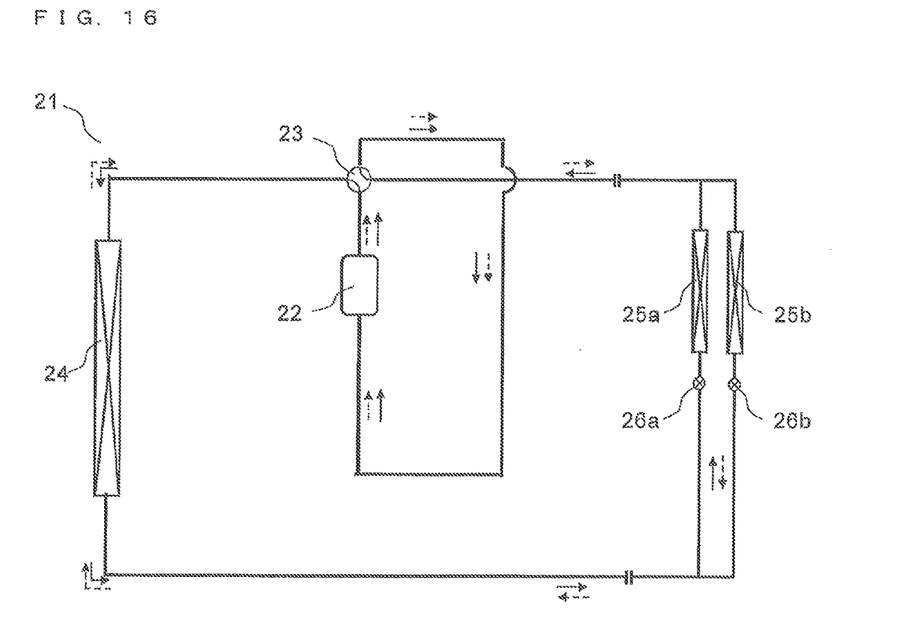
FIG. 16 is a view of a refrigerant circuit of an air-conditioning apparatus which uses the cross fin tube type heat exchanger in which the flat heat transfer tube of Embodiment 3 of the invention is incorporated.

FIG. 16 is a view of a refrigerant circuit of an air-conditioning apparatus which uses the cross fin tube type heat exchanger in which the flat heat transfer tube of Embodiment 3 is incorporated.

In FIG. 16, the flow of the refrigerant in a cooling operation is indicated by the solid line and the flow of the refrigerant in a heating operation is indicated by the dotted line.

The cross fin tube type heat exchanger 11 is used in the outdoor side heat exchanger 24 and the indoor side heat exchangers 25a, 25b.

Further, the cross fin tube type heat exchanger 11 may be used in only one of the outdoor side heat exchanger 24 and the indoor side heat exchangers 25a, 25b.

The flow of the refrigerant in a cooling operation will be described.

The high pressure and high temperature gas refrigerant which is ejected from the compressor 22 flows into the outdoor side heat exchanger 24 via a four-way valve 23, and turns into high pressure liquid refrigerant by transferring heat by heat exchange, and then flows out from the outdoor side heat exchanger 24.

In the outdoor side heat exchanger 24, high pressure is evenly applied to the inside of the flat heat transfer tube 1 due to a pressure difference with the outside air.

As a result, a pressure resistance strength which is higher than the design pressure is required for the flat heat transfer tube 1.

The high pressure liquid refrigerant which flows out from the outdoor side heat exchanger 24 flows into the expansion devices 26a, 26b in the indoor unit and turns into low pressure two-phase refrigerant.

The low pressure two-phase refrigerant which flows out from the expansion devices 26a, 26b flows into the indoor side heat exchangers 25a, 25b, and turns into low pressure gas refrigerant by being evaporated by heat exchange, and then flows out from the indoor side heat exchangers 25a, 25b.

Then, the low pressure gas refrigerant which flows out from the indoor side heat exchangers 25a, 25b flows into the outdoor unit, and is suctioned into the compressor 22.

The flow of the refrigerant in a heating operation will be described.

The high pressure and high temperature gas refrigerant which is ejected from the compressor 22 flows into the indoor side heat exchangers 25a, 25b via the four-way valve 23, and turns into high pressure liquid refrigerant by transferring heat by heat exchange, and then flows out from the indoor side heat exchangers 25a, 25b.

In the indoor side heat exchangers 25a, 25b, high pressure is evenly applied to the inside of the flat heat transfer tube 1 due to a pressure difference with the outside air.

As a result, a pressure resistance strength which is higher than the design pressure is required for the flat heat transfer tube 1.

The high pressure liquid refrigerant which flows out from the indoor side heat exchanger 25a, 25b flows into the expansion devices 26a, 26b in the indoor unit and turns into low pressure two-phase refrigerant.

The low pressure two-phase refrigerant which flows out from the expansion devices 26a, 26b flows into the outdoor side heat exchanger 24, and turns into low pressure gas refrigerant by being evaporated by heat exchange.

Then, the low pressure gas refrigerant which flows out from the outdoor side heat exchanger 24 is suctioned into the compressor 22.

Next, an example of installation of the cross fin tube type heat exchanger 11 will be descried.

Figure 17:
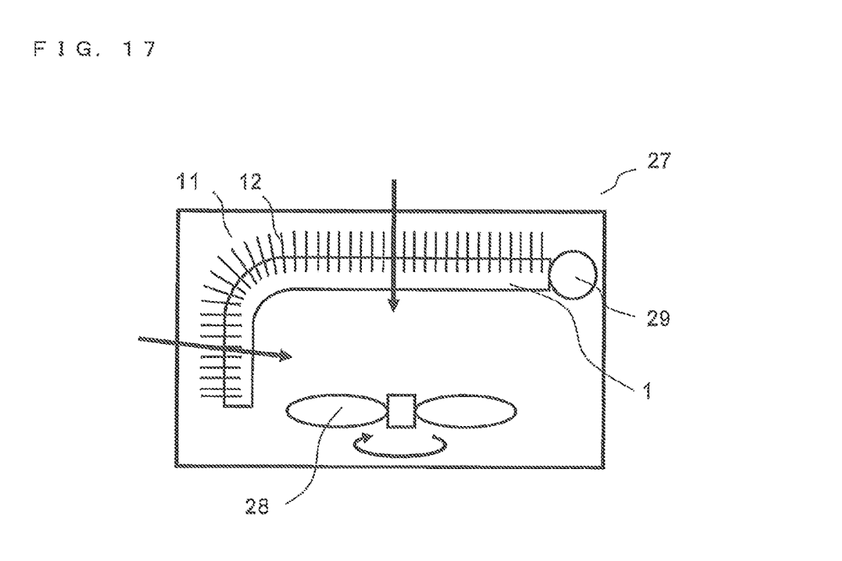
FIG. 17 is a view of an inner configuration of an outdoor unit of the air-conditioning apparatus which uses the cross fin tube type heat exchanger in which the flat heat transfer tube of Embodiment 3 of the invention is incorporated.

FIG. 17 is a view of an inner configuration of an outdoor unit of the air-conditioning apparatus which uses the cross fin tube type heat exchanger in which the flat heat transfer tube of Embodiment 3 is incorporated.

Although FIG. 17 shows the cross fin tube type heat exchanger 11 formed in L-shape, it may be in other shapes such as U-shape.

As shown in FIG. 17, the outdoor unit 27 includes the cross fin tube type heat exchanger 11, an air-sending device 28, and a header 29.

The plate fins 12 of the cross fin tube type heat exchanger 11 extend to the upstream side.

(Effect of the Cross Fin Tube Type Heat Exchanger)

An effect of the cross fin tube type heat exchanger in which the flat heat transfer tube according to Embodiment 3 is incorporated will be described.

In the cross fin tube type heat exchanger 11, the flat heat transfer tube 1 and the plate fins 12 are bent after they are bonded to each other.

Accordingly, an assembly step is simplified compared with the case where the flat heat transfer tube 1 is bonded to the plate fins 12 after it is bent, thereby preventing the increase in cost.

Further, in the cross fin tube type heat exchanger 11, the flat heat transfer tube 1 and the plate fins 12 are bonded by welding.

Accordingly, the flat heat transfer tube 1 and the plate fins 12 are prevented from being separated from each other when being bent after bonded.

The flat heat transfer tube 1 and the plate fins 12 may be bonded to each other by other bonding means which provides strong bonding.

When the flat heat transfer tube 1 and the plate fins 12 are bonded by welding, strong bonding can be achieved by a small number of steps.

Further, in the cross fin tube type heat exchanger 11, the plate fins 12 extend from the flat heat transfer tube 1 to the upstream side of the air flow.

The larger amount of the condensed water is condensed on the plate fins 12 on the upstream side of the air flow, that is, in the area close to the end of the plate fins 12.

Accordingly, in a similar manner to the cross fin tube type heat exchanger 11, since the plate fins 12 extend from the flat heat transfer tube 1 to the upstream side of the air flow, the condensed water is allowed to be smoothly dropped.

Embodiment 4

The flat heat transfer tube according to Embodiment 4 will be described. Description which is duplicated by or similar to that of the flat heat transfer tube according to Embodiment 1 to Embodiment 3 will be simplified or omitted as appropriate.

(Configuration of the Flat Heat Transfer Tube)

A configuration of the flat heat transfer tube according to Embodiment 4 will be described.

The flat heat transfer tube 1 is incorporated in the cross fin tube type heat exchanger 11 as the flat heat transfer tube according to Embodiment 3.

That is, the flat heat transfer tube 1 is bent in the long diameter direction of the cross section of the flat heat transfer tube 1 after it is bonded by welding to the plate fins 12.

The flat heat transfer tube 1 has a configuration similar to that of the flat heat transfer tube according to Embodiment 2.

When the flat heat transfer tube 1 is the meandering flat heat transfer tube 1 which is processed in a hairpin shape, the flat heat transfer tube 1 may have a configuration similar to that of the flat heat transfer tube according to Embodiment 1.

The following explains how the wall thickness $t_2 1$ on the outer side of the bending of the flat heat transfer tube 1 in the state before bending is determined will be described.

The wall thickness $t_2 1$ on the outer side of the bending is determined by the following equation 5 based on a minimum interval t0 which is required in the state after bending, the elongation rate a obtained by the equation 3, and a change rate $\sigma_{ratio}$ of the tensile strength between before and after welding.

The change rate $\sigma_{ratio}$ of the tensile strength between before and after welding is calculated by dividing a tensile strength $\sigma_{after}$ after welding by a tensile strength $\sigma_{before}$ before welding.

[Math. 5]

$$t_2 1 = t0 \times a \times \frac{1}{\sigma_{ratio}} \quad \text{(Equation 5)}$$

(Configuration of the Flat Heat Transfer Tube)

The material tensile strength of the flat heat transfer tube 1 itself may be decreased by welding heat during welding of the flat heat transfer tube 1 to the plate fin 12.

In the flat heat transfer tube 1, the wall thickness $t_2 1$ on the outer side of the bending in the state before bending is determined taking into consideration the decrease in tensile strength caused by welding heat.

Accordingly, even if the flat heat transfer tube 1 is bent in the long diameter direction of the cross section of the flat heat transfer tube 1 after it is bonded by welding to the plate fins 12, the wall thickness $t_2 1$ on the outer side of the bending is not insufficient, and a pressure resistance strength against the pressure of the refrigerant supplied to the holes 2 is ensured.

Although Embodiment 1 and Embodiment 4 have been described above, the present invention is not limited to those embodiments.

For example, each of the embodiments or variations may be combined.

REFERENCE SIGNS LIST 1 flat heat transfer tube 2 hole 11 cross fin tube type heat exchanger 12 plate fin 21 air-conditioning apparatus 22 compressor 23 four-way valve 24 outdoor side heat exchanger 25a, 25b indoor side heat exchanger 26a, 26b expansion device 27 outdoor unit 28 air-sending device 29 header A jig

The invention claimed is:

1. A flat heat transfer tube used for a cross fin tube type heat exchanger including the flat heat transfer tube having a bending portion and a plurality of holes extending through in a direction parallel with an axial direction of the flat heat transfer tube, and a plurality of plate fins bonded by welding to the flat heat transfer tube, wherein an interval between an outer surface of the flat heat transfer tube and an inner surface of at least one of the plurality of holes of a portion that is curved with a small curvature during bending is larger than an interval between an outer surface of the flat heat transfer tube and an inner surface of at least one of the plurality of holes of a portion that is curved with a large curvature during bending, wherein the intervals are measured in a radial direction of the curvatures and in a cross-sectional plane that extends through a portion of the flat heat transfer tube that corresponds to the bending portion before bending, and an interval (t) of a portion that is curved with the smallest curvature during bending is determined based on a minimum interval (t0) that is required after bending, an elongation rate (a), and a change rate ($\sigma_{ratio}$) of the tensile strength between before and after welding calculated by dividing a tensile strength after welding by a tensile strength before welding, and the elongation rate (a), a length (L) in a direction in which the curvature varies during bending of a length in a long diameter direction and a length in a short diameter direction of the cross section, and a radius of curvature (r) of a portion that is curved with the largest curvature during bending have a relationship of the following equation:

[Math. 1]

$$a = \frac{r+L}{r+L/2}.$$

2. The flat heat transfer tube of claim 1, wherein the interval (t) of the portion that is curved with the smallest curvature during bending, the minimum interval (t0), and the elongation rate (a) have a relationship of the following equation:

[Math. 2]

$$t = t0 \times a.$$

3. The flat heat transfer tube of claim 1, wherein the interval (t) of the portion that is curved with the smallest curvature during bending, the minimum interval (t0), the elongation rate (a), and the change rate ($\sigma_{ratio}$) have a relationship of the following equation:

[Math. 3]

$$t = t0 \times a \times \frac{1}{\sigma_{ratio}}.$$

4. The flat heat transfer tube of claim 1, wherein a size of one of the plurality of holes in the cross section of the portion that is curved with the small curvature during bending is smaller than a size of one of the plurality of holes in the cross section of the portion that is curved with the large curvature during bending.

5. The flat heat transfer tube of claim 1, wherein an interval between adjacent holes in the cross section of a portion that is curved with the small curvature during bending is larger than an interval between adjacent holes in the cross section of a portion that is curved with the large curvature during bending.

6. A manufacturing method of a cross fin tube type heat exchanger including the flat heat transfer tube having a bending portion and a plurality of holes extending through in a direction parallel with an axis direction of the flat heat transfer tube, and a plurality of plate fins bonded by welding to the flat heat transfer tube, comprising:

forming the holes in the flat heat transfer tube so that an interval between an outer surface of the flat heat transfer tube and an inner surface of at least one of the plurality of holes of a portion that is curved with a small curvature during bending is larger than an interval between an outer surface of the flat heat transfer tube and the inner surface of at least one of the plurality of holes of a portion that is curved with a large curvature during bending wherein the intervals are measured in a radial direction of the curvatures and in a cross-sectional plane that extends through a portion of the flat heat transfer tube that corresponds to the bending portion before bending;

welding the plate fins to the flat heat transfer tube in a state in which one end of the flat heat transfer tube in the long diameter direction protrudes; and bending the flat heat transfer tube that is welded to the plate fins while a jig is pressed against the one end thereof, wherein an interval (t) of a portion that is curved with the smallest curvature during bending is determined based on a minimum interval (t0) that is required after bending, an elongation rate (a), and a change rate ($\sigma_{ratio}$) of the tensile strength between before and after welding calculated by dividing a tensile strength after welding by a tensile strength before welding, and the elongation rate (a), a length (L) in a direction in which the curvature varies during bending of a length in a long diameter direction and a length in a short diameter direction of the cross section, and a radius of curvature (r) of a portion that is curved with the largest curvature during bending have a relationship of the following equation:

[Math. 4]

$$a = \frac{r+L}{r+L/2}.$$

7. A cross fin tube type heat exchanger that is manufactured by the method of claim 6.

8. The flat heat transfer tube of claim 1, wherein the intervals are direct intervals that are measured in a direct fashion such that the intervals are minimized.

9. The manufacturing method of a cross fin tube type heat exchanger of claim 6, wherein the intervals are direct intervals that are measured in a direct fashion such that the intervals are minimized.

* * * * *